United States Patent [19]
Stulbach

[11] Patent Number: 6,082,476
[45] Date of Patent: *Jul. 4, 2000

[54] SELF-RENEWING ELECTRICALLY DRIVEN AUTOMOBILE

[76] Inventor: Nathan Stulbach, 40 Brighton First Rd., Brooklyn, N.Y. 11235

[*] Notice: This patent is subject to a terminal disclaimer.

[21] Appl. No.: 09/315,203

[22] Filed: May 19, 1999

[51] Int. Cl.[7] .................................................. B60K 1/00
[52] U.S. Cl. .................... 180/65.3; 180/65.1; 180/65.8
[58] Field of Search ................................. 180/65.3, 65.1, 180/65.6, 65.4, 65.8, 165; 477/2, 3

[56] References Cited

U.S. PATENT DOCUMENTS

| | | | |
|---|---|---|---|
| 5,215,156 | 6/1993 | Stulbach et al. | 180/65.3 |
| 5,549,172 | 8/1996 | Mutoh et al. | 180/65.1 |
| 5,680,908 | 10/1997 | Reed | 180/65.3 |
| 5,689,174 | 11/1997 | Pacheco, Sr. | 322/16 |
| 5,818,115 | 10/1998 | Nagao | 290/31 |

FOREIGN PATENT DOCUMENTS

| | | | |
|---|---|---|---|
| 2225081 | 1/1974 | Germany | 180/65.3 |
| WO 92/01583 | 2/1992 | Germany | 180/65.3 |
| 514351 | 1/1938 | United Kingdom | 180/65.3 |

*Primary Examiner*—J. J. Swann
*Assistant Examiner*—James S. McClellan
*Attorney, Agent, or Firm*—Steven Horowitz

[57] ABSTRACT

A self-renewing electrically driven vehicle has electro-generating units 1 and 2. Unit one has an electrically charged starter battery, a first electric motor and a dynamo-electric generator connected to a first road-wheel axle. Unit two has a second electric motor, two initially uncharged batteries and two similar generators. Unit one starts the automobile and maintains it for a short time until unit two can operate the vehicle. As a result of a rotary motion transferring device, while the vehicle is in motion, the generator of unit one receives mechanical energy generated by the first road-wheel axle and converts that mechanical energy into electrical energy which automatically flows into the starter battery to recharge it. From the inception of the vehicle's movement and onward, each generator of unit two receive mechanical energy from the second road-wheel axle that they are connected to and convert this energy into electrical energy which they send to the two storage batteries of unit two. Switching means detects when these two storage batteries of unit two reach a predetermined level of electric power and then (i) engages the electric motor of unit two to the second road wheel axle to operate the vehicle for the remainder of the trip and (ii) disengages the first electric motor of unit one from the first road wheel axle. The starter battery is thus perfectly recharged for the next trip of the vehicle and the vehicle can travel long distances at enhanced accelerations without recharging the batteries.

2 Claims, 2 Drawing Sheets

SELF-RENEWING ELECTRICALLY DRIVEN AUTOMOBILE

1. Field of the Invention

This invention relates to electric vehicles and more particularly to an electric vehicle having multiple electric motors.

2. Description of the Prior Art

The main advantage of electrically powered cars and trucks over gasoline powered vehicles is the desire to use a form of energy that does not produce environmental pollution and the desire to avoid being dependent on energy derived from crude oil. Electrically powered cars and trucks have recently experienced a resurgence of interest from automotive companies. While electrically powered vehicles that make use of storage batteries have been around for several decades, renewed interest in them stems from the progress in overcoming the two main drawbacks that had drastically limited their marketability and value. These drawbacks are the limited distance they could travel using their storage batteries before a driver would have to stop and recharge and the limited speed (and acceleration) that an electric motor can cause the car to travel at within reasonable cost production parameters for electric vehicles. Based on a 1996 article in a leading nationally circulated, it is expected that American automotive companies will be able to produce electric cars in a decade or so that can travel a meaningful distance, such as 80 miles, before the need for recharging and that can reach speeds of 50 or 55 miles per hour with acceptable levels of acceleration. This has sparked a renewed interest in electric vehicles in general.

Even with the new electric vehicles expected to be available in a decade or so, however, the maximum capacity of the vehicle is still less than 100 miles before recharging is necessary. This drawback is a clear competitive disadvantage of electric vehicles over gasoline engine vehicles since gasoline engine vehicles often travel for over 200 miles on a single tank of gas.

There is a need for an improved electric vehicle wherein the distance it can travel will not be limited to an amount lower than the distance that a gas driven vehicle can travel.

In addition, electric vehicles, as presently proposed, have reduced speed and acceleration capacities relative to gasoline engine vehicles, although this discrepancy has been reduced. As a corollary to that general point, it is also true that any heavily loaded vehicle, such as a truck, whether electric or not, would find it difficult to accelerate effectively when going up a hill since the force needed to propel a vehicle is significantly greater when going uphill due to the effects of gravity. Accordingly, there is also a need in general for enhanced speed and acceleration powers to be available to electric cars and trucks.

The present invention meets all of these needs. In particular, the present invention provides for electric vehicles that can travel longer distances at desirable speeds and desirable acceleration powers.

SUMMARY OF THE INVENTION

The present invention provides a means of incorporating the advantages of electric power into a vehicle without its disadvantages. The vehicle of the present invention operates initially on electro-generating unit one from the energy of the starter battery and then it operates on electro-generating unit two whose batteries receives electrical energy from unit two's two generators. When unit two takes over the operation of the vehicle, the electric motor of unit one can be inactive. By dividing the electro-generating system of this vehicle into two units, unit one and unit two which are operated at different times, there is an efficient accumulation and organized utilization of the electricity generated by the rotary movement of wheels 6 of the vehicle. The starter storage battery makes it possible to travel a very long distance journey by automobile with a once in a lifetime investment of one starter battery.

OBJECTS AND ADVANTAGES

The following important objects and advantages of the present invention are:

(a) to provide an electric vehicle with the ability to travel as long as a vehicle that uses a gasoline fueled internal combustion engine, (b) to provide an electric vehicle that, while being able to travel as long as a vehicle that uses gasoline combustion engine, has enhanced acceleration and speed over existing electric vehicles, (c) to provide a vehicle containing two electro-generating units each having an electric motor wherein each of the two electro-generating units can work as an alternative to the other, (d) to provide a vehicle containing two electro-generating units each having an electric motor wherein electro-generating unit one starts the vehicle and maintains for a short time until electro-generating unit two can take over the operation of the vehicle, (e) to provide a vehicle containing two electro-generating units each having an electric motor wherein electro-generating unit one is recharged during each trip so that it can start the vehicle again for the next trip, (f) to provide a vehicle containing two electro-generating units, wherein electro-generating unit one has a starter battery, an electric motor and a generator and wherein electro-generating unit two has an electric motor, two generators and two storage batteries, (g) to provide an electric power cycle in an electric vehicle, which vehicle has its own two electro-generating units, and wherein the vehicle initially runs using unit one and in so doing charges a starter storage battery by means of its own electro-generating system and that switches over to being operated by electro-generating unit two when the storage batteries of unit two have been sufficiently charged, (h) to provide an electric vehicle having increased torque, and (i) to provide an electric vehicle that an travel very long distances without the need to ever recharge batteries.

DETAILED DESCRIPTION OF THE PREFERRED EMBODIMENT

Electric vehicles, such as electric cars, are driven by electric power from their storage batteries. The vehicle of the present invention has two electric motors contained in two electro-generating units—units one and two.

Figure 1:
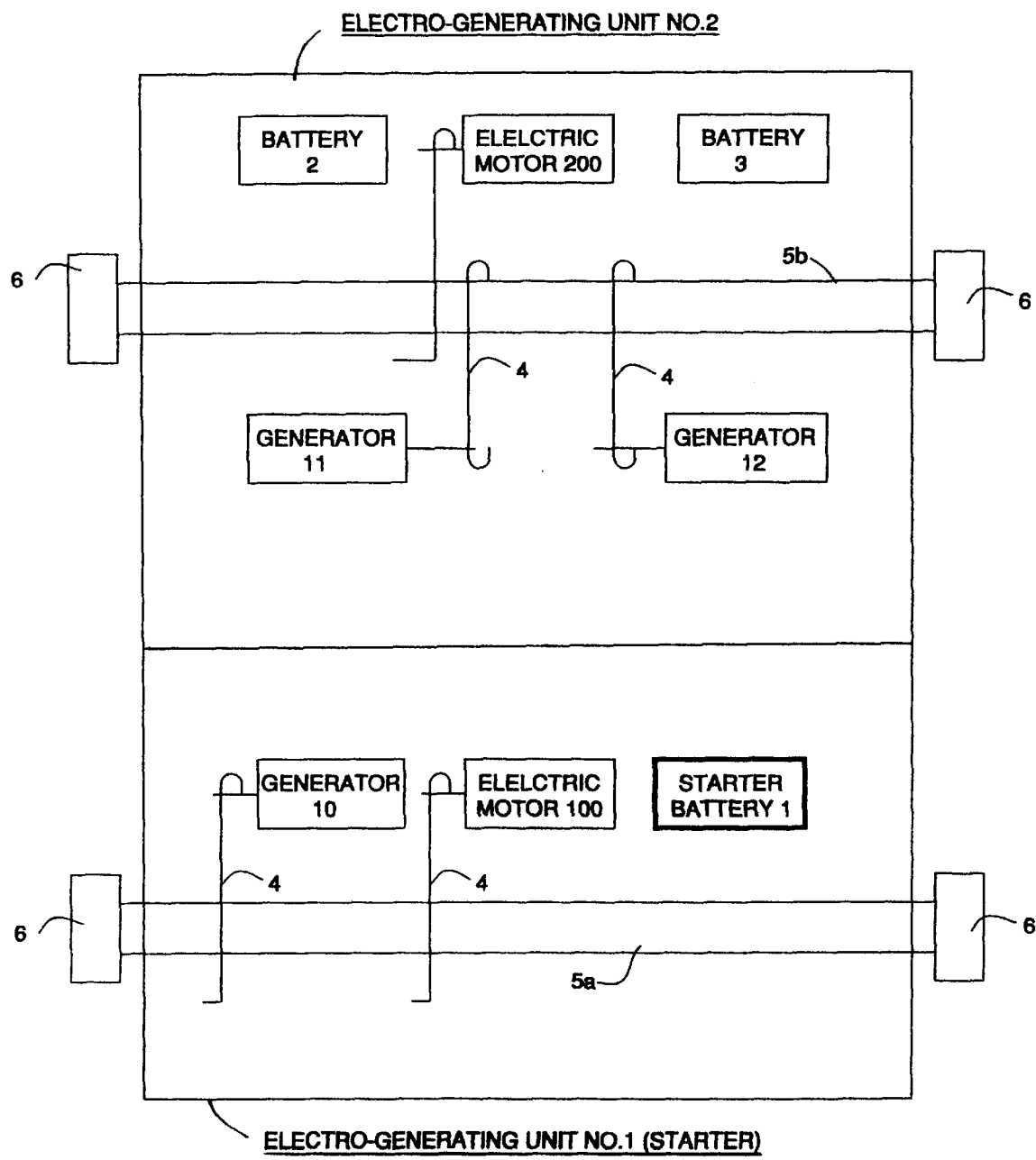
FIG. 1 is a block diagram depicting the mechanical interaction between the two electro-generating units of the vehicle of the present invention.
Figure 2:
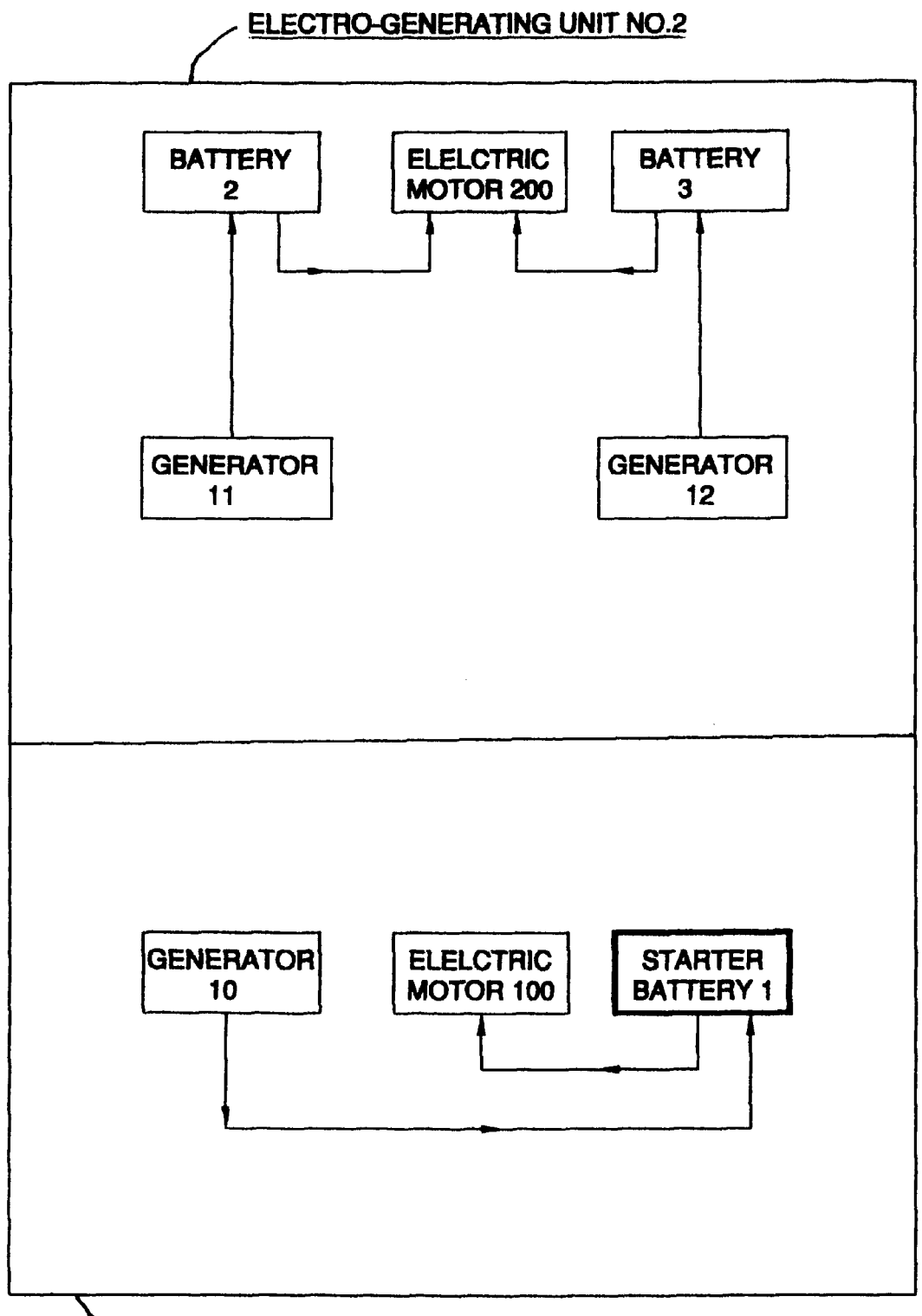
FIG. 2 is a block diagram depicting the flow of electrical energy in the electro-generating units of the vehicle of the present invention.

As seen from FIGS. 1 and 2, the vehicle of the present invention is a self-renewing electrically driven vehicle that has electro-generating units 1 and 2 (sometimes called "unit one" and "unit two") which are preferably employed alternately in the operation of the vehicle, such as an automobile. Unit one has a starter storage battery 1, sometimes called starter battery 1, that has its own initial supply of electricity and that feeds electricity to a standard first electric motor 100. Dynamo-electric generator 10 is connected to a road-wheel axle 5a by well known means of gear 4 or belt 4. Each road-wheel axle 5a, 5b is a standard axle known in the art and runs from a wheel 6 on one side of the vehicle to a wheel 6 on the opposite side of the vehicle. Generator 10 feeds electrical energy to starter storage battery 1.

Electro-generating unit two has second electric motor 200, two storage batteries 2, 3, and two dynamo-electric generators 11, 12 that are connected to a second road-wheel axle 5b by means of gear 4 or belt 4. As seen in FIG. 2, generator 11 feeds electricity to and charges battery 2 and generator 12 feeds electricity to and charges battery 3. Batteries 2 and 3 provide electricity to second electric motor 200.

Unit one starts the automobile and maintains it for a short time until unit two can operate the vehicle until the end of the trip, as explained more fully below. Unit one can then be used to restart the vehicle in any future trip. All the advantages of electric vehicles (environmentally purer energy source, etc.) are preserved without the disadvantages (slower, cannot go as far).

In operation, the vehicle is initially started and is then driven by electro-generating unit one. As a result of a rotary motion transferring device well known in the art and the fact that the electrodynamic generator 10 is connected to the vehicle's road-wheel axle 5a, the generator 10 of unit one receives mechanical energy generated by the road-wheel axle 5a while the vehicle is in motion and converts that mechanical energy into electrical energy which automatically flows into starter battery 1 to recharge it with electric power while the vehicle is in motion and the vehicle's road wheels 6 are turning. From the inception of the vehicle's movement and onward, each of the two generators 11, 12 of unit two receives mechanical energy from the road-wheel axle 5b that generators 11, 12 are connected to by means of belt 4 or gear 4. From the inception of the vehicle's movement and onward generators 11, 12 convert the mechanical energy they receive into electrical energy, which electrical energy is sent to storage batteries 2 and 3 associated with that generator.

When these two storage batteries 2, 3 of unit two reach a predetermined level of electric power, any known switching means detects this fact and then (i) commences operation of the electric motor 200 of electro-generating unit two to operate the vehicle for the remainder of the trip by engaging electric motor 200 to second road wheel axle 5b while simultaneously (ii) shutting off the electric motor 100 of electro-generating unit one by disengaging electric motor 100 from first road wheel axle 5a. When electric motor 200 is operating the vehicle, electric motor 100 is dormant but generator 10 is constantly generating electrical energy and sending it to starter storage battery 1 to replenish the power used up by starter storage battery 1 during the initial period of the trip when electro-generating unit one was operating the vehicle. The starter battery is thus perfectly recharged for the next trip of the vehicle.

The movement of the vehicle will cause a continuous charging of starter storage battery 1 and of storage batteries 2 and 3 with electricity while the vehicle is in motion, thus accumulating in the batteries 1, 2, 3 the electric power produced by every revolution of the vehicle's road-wheels.

Each of the generators 10, 11, 12 of the present invention is connected to the vehicle's road-wheel axle in the manner described in FIGS. 1–5 of U.S. Pat. No. 5,215,156 which are incorporated by reference. For example, the generator's axis can be linked by a rotary motion transferring device, such as a gear, belt, band, etc. 4 with the vehicle's road wheel axle 5a, 5b so that the rotary motion of the vehicle's revolving road-wheels 6 is thereby transmitted to the dynamo-electric generator 10, 11, 12 by means of this rotary motion transferring device 4. The circumference of the vehicle's road-wheel axis 5a, 5b may be enlarged on the spot where the rotary motion transferring device 4 engages the road wheel axles 5a, 5b. Thus the rotary motion transferring device can have mechanical turns amplifier means for coupling any of the generators 10, 11, 12 to a road wheel axle 5a, 5b of the vehicle.

Operation of the Vehicle

The only outside power source of the vehicle is the initial use of starter storage battery 1. According to the present invention, while the electric motor 100 of electro-generating unit one has started the vehicle and is running the vehicle with the power of starter storage battery 1 the electric motor 200 of unit two is standing still but generators 11 and 12 of Unit two are producing electrical energy, which energy is being accumulated in batteries 2 and 3.

At the moment when the electrical load of batteries 2 and 3 has reached a predetermined level of electrical power sufficient to allow electric motor 200 to assume operation of the vehicle, application of switching means causes electric motor 100 to cease running the vehicle and causes electric motor 200 is to begin powering the vehicle. Electric motor 200 is then powering the vehicle with the combination of the electrical power previously stored in storage batteries 2 and 3 from the beginning of the vehicle's movement and the power being continuously generated by generators 11 and 12, which additional power is being continuously fed anew into batteries 2 and 3.

It should be noted that batteries 2 and 3 are not charged with any electrical power at the beginning of the vehicle's movement (at the beginning of the vehicle's trip) and are only charged with electrical power from the generators 11 and 12 during the vehicle's trip. In contrast, starter storage battery 1 comes with electric power; that is, starter storage battery 1 is charged with its own supply of electric power from the very beginning of the vehicle's trip.

Although the invention has been described in detail in the foregoing specification along with the accompanying drawing with respect to various embodiments thereof, these are intended to be illustrative only and not limiting. One skilled in the art will recognize that various modifications and variations may be made therein which are within the spirit of the invention and the scope of the appended claims.

What is claimed is:

1. A vehicle operated by two electro-generating units, including:
   (A) electro-generating unit one which starts and maintains the vehicle for a short time, comprising:
   a starter storage battery,
   a dynamoelectric generator that converts mechanical energy from a revolution of a road wheel axle of the vehicle into electrical energy and feeds the electrical energy to the starter storage battery,
   a rotary motion transferring device for coupling said dynamoelectric generator to a road wheel axle of the vehicle,
   a first electric motor and means for coupling said first electric motor to a first road wheel axle of the vehicle, (B) electro-generating unit two which assumes control over operation of the vehicle a short time after the vehicle starts moving, comprising:
   a second electric motor and means for coupling said electric motor to a second road wheel axle of the vehicle,
   two dynamoelectric generators that each convert mechanical energy from a revolution of a road wheel axle of the vehicle into electrical energy,
   two storage batteries each of which are charged by and connected to one of said dynamoelectric generators and which are connected to and feed electric energy to the second electric motor, and (C) means for detecting the electric power level of said storage batteries and, if said electric power has attained a predetermined level, for disengaging the first electric motor from the first road wheel axle and engaging the second electric motor to the second road wheel axle of the vehicle in order to allow electro-generating unit two to operate the vehicle.

2. The vehicle of claim 1, wherein the starter storage battery comes charged with electric power at a beginning of a trip of the vehicle and wherein the storage batteries are not charged with electric power at the beginning of the trip of the vehicle.

* * * * *